Jan. 9, 1968  G. ROUVALIS  3,363,157
MANUAL AND AUTOMATIC SERVO SYSTEM
Filed June 11, 1964  2 Sheets-Sheet 1

WITNESSES:
Bernard R. Giegaus
James F. Young

INVENTOR
George Rouvalis
BY P.M. Brodahl
ATTORNEY

United States Patent Office 3,363,157
Patented Jan. 9, 1968

3,363,157
MANUAL AND AUTOMATIC
SERVO SYSTEM
George Rouvalis, Pittsburgh, Pa., assignor, by mesne assignments, to Westinghouse Electric Corporation, Pittsburgh, Pa., a corporation of Pennsylvania
Filed June 11, 1964, Ser. No. 374,520
4 Claims. (Cl. 318—18)

ABSTRACT OF THE DISCLOSURE

A signal converter is disclosed, including a pivotally supported balance bar, which is adapted for control operation in either of an automatic mode or a manual mode, and the transfer between these modes of operation can be effected without a disturbing pump or sudden change in the resulting movement of the cooperative output position device. A position memory function is provided in the form of an output force signal memory capsule, which is supplied with the output force signal during manual operation and is disconnected during automatic operation. The cooperative signal controller amplifier during manual operation monitors any changes manually effected in the output force signal through operation of a provided position tracking amplifier and upon a transfer to automatic operation the signal controller amplifier provides an initial zero value control signal which is thereafter generated as required to provide the desired output force signal to the provided output position device.

---

The present invention relates in general to position control apparatus, and more particularly to position control apparatus operative in each of a manual mode and an automatic mode, with the ability to effect a bumpless transfer or change in operation therebetween from manual to automatic as well as from automatic to manual whenever and as may be desired.

It has been known in the prior art to provide a position control system including a signal converter such as a pneumatic device or an electric motor to position an output device in response to a first input or set point signal and couple thereto a feedback signal providing element, such as a potentiometer having a tap that is moved in conjunction with the desired and controlled movement of this output device, to send back a second input signal to the position control system to neutralize any first input signal that caused a movement of the output device. One such signal converter has been a pneumatic device including a pivotally supported balance bar that is subjected to a first torque as a function of the above first desired position input signal and a second balancing torque as a function of a feedback signal in accordance with the resulting movement of the output device.

With the advent of automatic control systems, which are automatically operative for example in response to a computer provided first desired position input signal, there occurs the necessity for maintenance, emergency or other reasons to provide periodic manual control of the movement of the output position device by means of a manually adjusted signal source such as a potentiometer. The transfer of the control operation from automatic operation to manual operation and back from manual operation to automatic operation has in the past been difficult to effect without a bump or sudden change in the resulting movement of the output position device.

Accordingly, it is an object of this invention to provide an improved position control apparatus that is better operative to effect a bumpless transfer between the manual and automatic modes of operation at any time and with less sudden change in the controlled system parameter.

It is another object to provide an improved signal converter for a position control system having a memory function to enable it to effect a bumpless transition at any time during its operation in response to either an automatically provided input signal or to a manually provided change signal when part of that position control system.

In accordance with the teachings of the present invention, position control apparatus is provided including a signal converter responsive to a generated position control signal for energizing the signal converter to produce an output force signal which is supplied to an output position device operative with a controlled process such as a furnace damper or the like. The signal converter includes a memory element, such as an output force signal memory capsule, that is supplied the output force signal from the signal converter through a signal gate or solenoid valve, which during the manual change mode and the manual stand-by mode of operation is open to provide the signal converter with the output force signal, for example by means of expansion of the capsule and compression of an interconnected spring.

When the signal converter is in its automatic mode of operation, the innerconnecting signal gate or solenoid valve is closed to block the supply of output force signal to the feedback memory element or capsule.

In the manual change mode operation, one of a manually controlled position increase signal or a position decrease signal is applied to the signal converter, and in this way the output force signal and the reference signal supplied by the memory capsule are varied as desired.

When it is desired to switch from manual stand-by to automatic operation, the generated position control signal can be again connected to the signal converter without effecting a bump or sudden change in the output force signal. The signal gate or solenoid valve is now closed to disconnect the memory element from the output force signal, and any resulting change in the output position device is a gradual and integrated change causing the controlled amplifier to again generate a position control signal as required to provide the desired position for the control device.

These and other objects and advantages of the present invention will become apparent in view of the following description taken in conjunction with the drawings wherein.

Figure 1:
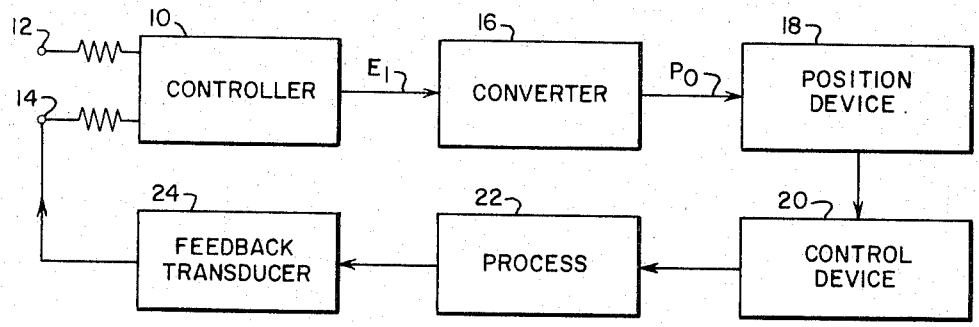
FIGURE 1 is a diagrammatic showing of the present control apparatus.

In FIG. 1 there is shown a well known feedback control system including a proportional plus integral signal controller 10 having a first input terminal 12 adapted to receive a set point or desired input signal and a second input terminal 14 adapted to receive an actual operation feedback signal, with the controller 10 being operative to provide a position control signal $E_1$ in accordance with the difference between the applied input signals. This position control signal is supplied to a signal converter 16 operative to convert the electrical position control into a corresponding output force signal, such as a pneumatic pressure signal $P_0$, which is supplied to a position device 18 connected to move a control device 20 such as a damper valve for controlling the operation of a process 22 such as a furnace. The operation of the process 22 is sensed by means of a suitable feedback transducer 24 for, in turn, providing a controlled variable or an electrical actual operation feedback signal to the input 14.

Figure 2:
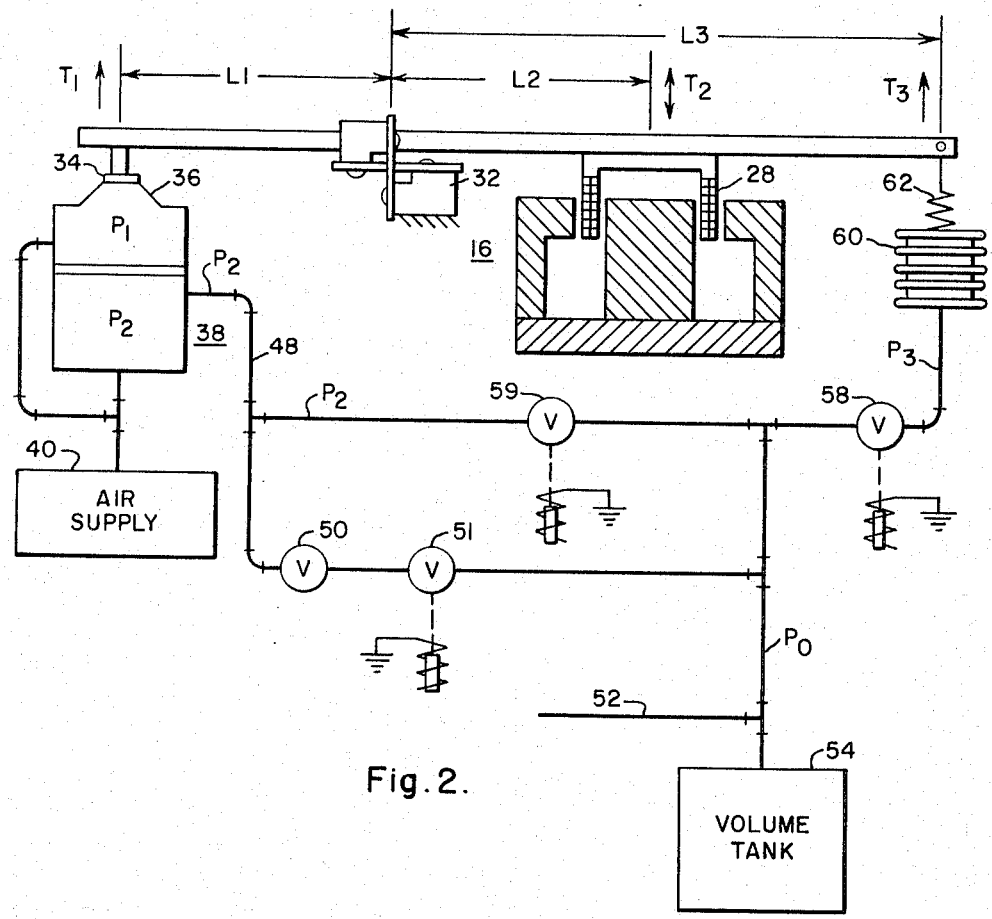
FIG. 2 is a schematic showing of the force signal converter device.

In FIG. 2 there is shown a schematic illustration of a signal converter 16 in accordance with the present invention, and including an electric signal troque coil 28 for controlling the movement of a balance arm 30 through torque $T_2$ determined by the resulting force operating through the lever arm $L_2$ and relative to a fixed pivot support 32. One end of the balance arm 30 includes a flapper 34 operative with a nozzle for controlling the output pressure $P_2$ from a per se well known and conventional pneumatic booster 38. A force resulting from the fluid pressure applied against the flapper nozzle 34 is operative through the lever arm $L_1$ to apply a clockwise torque $T_1$ to the balance arm 30. The pneumatic booster 38 is operative with an air supply 40 for providing a desired variation in the output pressure $P_2$ as determined by operation of the flapper nozzle 34 to control the output pressure $P_2$. The output pressure $P_2$ passes through a conduit 48 leading to a needle valve 50 and a solenoid valve 51 to an output conduit 52, with the needle valve 50 being adjusted to operate as an integrating device. A volume tank 54 is provided operative with conduit 52. A second solenoid valve 59 is disposed to control the fluid flow in a parallel conduit connected between the conduit 48 and the output conduit 52. A solenoid valve 58 leads to a positive feedback or memory capsule 60. The volume of the memory capsule 60 is in the order of $\frac{1}{10}$ of a cubic inch as compared to the volume of the volume tank 54 being in the order of 50 cubic inches. The memory capsule 60 is operative through a compression spring 62 to apply a counteracting or balancing counterclockwise torque $T_3$ determined by the resulting force acting through the lever arm $L_3$ and applied to the balance bar 30. The output force signal $P_0$ from conduit 52 is substantially linear during automatic mode of operation relative to the position control signal $E_1$ applied to the torque coil 28; when the latter position control signal $E_1$ is zero, the output pressure $P_2$ in conduit 48 substantially equals the pressure $P_3$ within the capsule 60 for all values of $P_3$ due to the operation of the signal converter 16.

Figure 3:
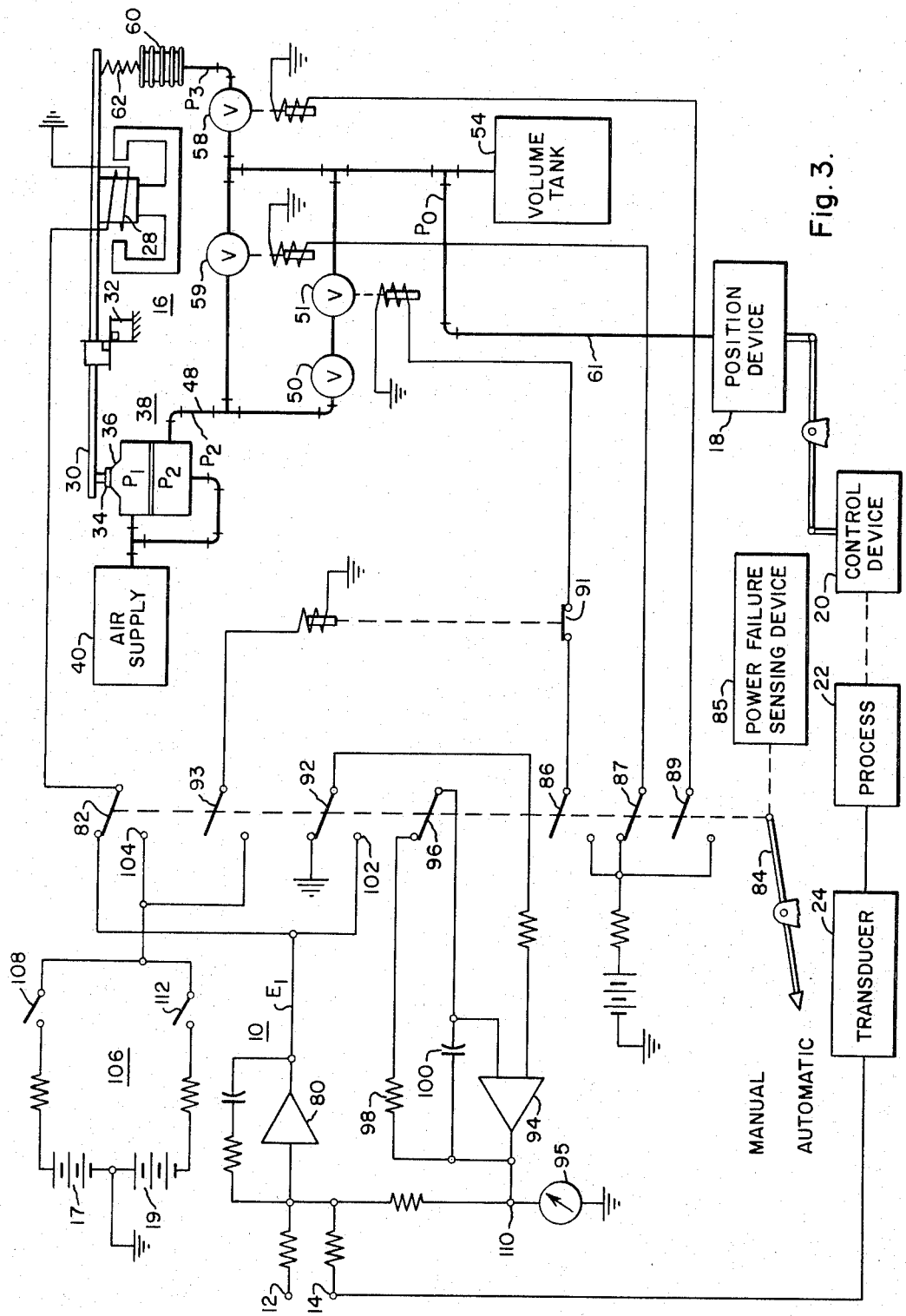
FIG. 3 is a schematic showing of the present control apparatus.

In FIG. 3 there is schematically shown the control apparatus in accordance with the present invention and operative to provide bumpless or changeless transfer in its operation from automatic mode to manual stand-by mode and back from manual stand-by mode to automatic mode without the need for rebalancing of the balance arm 30. The control apparatus shown in FIG. 3 is operative to allow the balance arm 30 to stand substantially still in the event of a power failure and further allows the signal converter 16 to be operated in a manual change mode with the use of emergency batteries 17 and 19 or the like.

In FIG. 3 there is shown a controller 10 including a proportional plus integral functional amplifier 80 responsive to the difference between the set point or desired position input signal applied to terminal 12 and the actual operation feedback signal applied to terminal 14. This difference is amplified to provide an output position control signal $E_1$. The mode selection member 84 is illustrated in the automatic mode location, to connect the position control signal $E_1$ from amplifier 80 through switch 82 to energize the torque coil 28 and apply one of a positive or a negative torque $T_2$ to the balance arm 30 relative to the pivot support 32 for moving the flapper 34 operative with the pneumatic booster 38 to in effect control the value of the output pressure signal $P_2$ supplied to the conduit 48.

In the automatic mode of operation the mode selection member 84 closes the switch 87 to energize and thereby open the solenoid valve 59 to connect the output pressure $P_2$ through the valve 59 to the volume tank 54. The mode selection member 84 does not close the switch 86 and solenoid valve 51 stays closed during automatic operation, and the switch 89 is not closed at this time such that solenoid valve 58 stays closed. Any change now requested by a computer or similar set point providing device in the operation of control device 20 is operative to vary the output pressure $P_2$ as necessary to vary the output force signal $P_0$ in conduit 61 connected to the control device 20 through the position device 18. The resulting movement of the control device 20 varies the process 22, and the process operation sensing transducer 24 senses this to provide a feedback signal to input 14 to stabilize the position control signal $E_1$ supplied by the controller amplifier 80 as required to now hold this requested position for the control device 20.

With the mode selection member 84 in the automatic mode location, as shown in FIG. 3, the switch 92 is connected to ground the input to the tracking amplifier 94, and the switch 96 is positioned to connect the resistor 98 in parallel with the integrating capacitor 100 and thereby provide a discharge path for the capacitor 100. This reduces, after a predetermined time delay, any output signal from the tracking amplifier 94 to a zero value.

If it is desired to operate the control apparatus shown in FIG. 3 in the manual stand-by mode of operation, the mode selection member 84 is moved to its second or the manual standby location to close the switch 89 and thusly energize the solenoid valve 58 to thereby open the latter valve 58 and connect the memory capsule 60 to the volume tank 54. The switch 87 is opened to deenergize the solenoid valve 59 and thereby close the valve 59. The switch 86 is closed, but the still open relay 91 prevents the energization of the solenoid valve 51 and thus it remains closed at this time The switch 92 is moved to a position to contact the terminal 102 for connecting the position control signal $E_1$ of the controller 80 to the input of the tracking amplifier 94. The switch 96 is moved to disconnect the resistor 98 relative to the integrating capacitor 100, and the switch 82 is moved into contact with terminal 104 for connecting the manual change control circuit 106 with the torque coil 28 of the converter 16. The switch 93 closes to permit closing of the relay 91 whenever one of the manual change control switches 108 or 112 is closed, and closing of the relay 91 during the manual change mode of operation energizes the solenoid valve 51 to open the latter valve when this happens.

In the manual change mode of operation of the control apparatus shown in FIG. 3, closing of the switch 108 results in a positive polarity energization of the torque coil 28 to cause the balance arm 30 to move in a manner to increase the output pressure $P_2$ supplied to the conduit 48 with the signal converter 16 now functioning as an integrating device. The now open valve 51 allows this output pressure $P_2$ to pass into the conduit 61 such that the position device 18 changes the position of the damper control device 20 and adjusts the operation of the process 22 to cause transducer 24 to supply a different process feedback signal to the input. The controller 80 correspondingly provides a position control signal $E_1$ which is applied through the terminal 102 and the switch 92 to cause the tracking amplifier 94 to provide an output signal to the input 110 of the controller 80, which latter output signal is equal to the negative of the algebraic sum of the process feedback signal supplied through the input 14 and the desired set point signal supplied through the input 12. The function of the tracking amplifier 94 is to bring to a zero value in this manner the output position control signal $E_1$ of the controller amplifier 80.

If it is desired to decrease manually the position of the control device 20, the switch 112 is instead manually closed to energize as desired through the terminal 104 and the switch 82 the torque coil 28 with a negative polarity signal to cause the balance arm 30 to adjust in a manner to decrease the output pressure $P_2$ supplied by the pneumatic booster 38 to the conduit 48. Since the solenoid valve 58 is now open, the pneumatic pressure within the capsule 60 follows this change in the output pressure $P_2$. The position device 18 decreases the position of the damper 20 and adjusts the process operation to provide through the transducer 24 an appropriate feedback signal to the input 14. Through the operation of the controller amplifier 80, the tracking amplifier 94 is now caused to increase correspondingly the value of its output signal supplied to the input 110 such that the combined feedback signal supplied to the input 14 and the output signal from the tracking amplifier 94 supplied to the input 110 are effective to match the value of the reference or set point signal supplied to the input 12, as previously explained.

Whenever it is desired to change the operation back to an automatic mode, the mode selection member 84 is moved to the illustrated automatic mode location to connect the position control signal $E_1$ at its now current zero value from the amplifier 80 to the torque coil 28, and to move the switch 92 to provide a ground signal to the input of the tracking amplifier 94. The switch 96 is simultaneously moved to connect the resistor 98 in parallel with the integrating capacitor 100 and thereby provide a time delay discharge path for the latter capacitor 100 such that the output signal from the tracking amplifier is gradually reduced to zero. The now resulting change in the position control signal $E_1$ from the amplifier 80 causes the converter 16 to adjust through the now open valve 59 the movement of the position device 18 and the control device 20 such that the feedback signal from the transducer 24 is made to cause the position control signal $E_1$ supplied to the torque coil 28 to assume the value required to position the control device 20 as desired by the automatically determined set point signal supplied to terminal 12.

In the operation of the control apparatus shown in FIG. 3, during automatic mode operation when the output signal $E_1$ of the controller 10 is zero as supplied through the switch 82 to the torque coil 28, the output pressure $P_2$ within the conduit 48 equals the trapped pressure $P_3$ within the capsule 60. When the control signal $E_1$ applied through the switch 82 to the torque coil 28 has a positive value, the pressure $P_2$ from the pneumatic booster 38 is greater than the capsule pressure $P_3$. When the control signal $E_1$ supplied through the switch 82 to the torque coil 28 is negative, the pressure signal $P_2$ from the pneumatic booster 38 is less than the pressure $P_3$ within the capsule 60. The control apparatus shown in FIG. 3 is operative during automatic mode of operation to provide the value of position control signal $E_1$ to the torque coil 28 relative to the trapped pressure $P_3$ within the capsule 60, necessary to satisfy the set point or desired position signal supplied to the input 12 of the controller amplifier 10. If desired, a null signal sensing meter 95 can be connected between the terminal 110 and ground to sense a zero output signal provided by the tracking amplifier 94. This permits manual adjustment of the position of control device 20 to enable a balancing of the control system at this time. The controlled variable is now the same as the set point signal.

If the control apparatus shown in FIG. 3 is transferred to manual stand-by, by shifting the location of mode selection member 84, or in the event of a power failure, the coil 28 is not energized by the controller amplifier 10 and the volume tank 54 which was connected to the conduit 58 is now transferred to the capsule 60 through the now open valve 58. A suitable power failure sensing relay device 85 including a relay operative to move the mode selection member 84 is effective to open valve 58 and close valve 59 and to disconnect the torque coil 28 and thereby in effect place the control apparatus in manual stand-by operation. The volume of the capsule 60 is very small compared to that of the volume tank 54, such that no meaningful change in the pressure within the volume tank 54 takes place when this latter power failure transfer occurs. Therefore, the result is that the output pressure $P_0$ will not change and it will be stored in the capsule 60 for future use. At the time the tracking amplifier 94 will force the output position control signal $E_1$ of the controller 80 to a zero value so that bumpless transfer back to automatic mode of operation can take place at any time and when desired. The output signal from the tracking amplifier 94 corresponds to the negative of the operational error. When the control apparatus is transferred to automatic mode of operation, the resistor 98 is connected across the integrating capacitor 100 to slowly decrease the output signal from the tracking amplifier 94 to zero, and this changes the operation control signal as necessary to maintain the set point operation as desired.

In order to manually change or index the position of the balance arm 30 of the converter 16 in manual change mode of operation, the manual control circuit 106 is provided. The output pressure $P_2$ within the conduit 48 will increase or decrease in a linear manner relative to the applied manual change control signals to the torque coil 28 during manual change mode of operation. When the increase or the decrease manual switch 108 or 112 respectively is returned to its open and stand-by position the solenoid valve 51 and the valve 58 close and the coil 28 is no longer energized.

Thus, it will be seen that position control apparatus for a control device 20 has been illustrated which in the automatic mode of operation includes the controller amplifier 80 having an output control signal $E_1$ that is the amplified proportional plus integral difference between a set point or desired operation signal and the actual operation feedback signal supplied to terminal 14 as provided by the feedback transducer 24. It should be generally noted as well in this art that the absolute value of the operation control signal $E_1$ from amplifier 80 has no direct relationship to the resulting position of the position device 18, other than a more positive value of the operation control signal $E_1$ will increase the position of the position device and vice versa. The operation control signal $E_1$ is sent to the electrical to pneumatic converter 16 to produce an output pressure signal $P_2$ which will determine the position of the pneumatic position device 18 or diaphragm operator. The converter 16 is designed with positive feedback on the balance arm 30 during manual change mode of operation by means of the compression spring 62 and the memory capsule 60. With a zero operation control signal $E_1$ applied to the torque coil 28, the output pressure $P_2$ within conduit 48 will equal the pressure $P_3$ within the capsule 60 which is acting to provide a positive feedback force to the balance arm 30.

In a very general consideration of the present control apparatus, during automatic operation of the control device 20, the output pressure $P_0$ within the conduit 61 is in accordance with the following relationship $P_0 = P_3$ (within capsule 60) plus $KE_1$ (energization of torque coil 28) and the signal converter 16 operates in a proportional manner. During manual stand-by operation, the output pressure $P_0$ is in accordance with the following relationship $P_0 = P_3$ (within capsule) and since $E_1$, the energization of torque coil 28 is now zero, the pressure $P_2$ within conduit 48 equals the pressure $P_3$ within capsule 60. During manual change mode of operation by either one of the switches 108 or 112, the signal converter 16 becomes an integrator with $P_3$ equal to $P_0$ and the pressure $P_2$ within the conduit 48 is one of greater than or less than the pressure $P_0$ depending upon the respective closing of one of the switches 108 or 112.

Although the present invention has been described with a certain degree of particularity it should be understood that the present disclosure has been made only by way of example and that numerous changes in the details of construction and the combination and arrangement of parts may be resorted to without departing from the scope and spirit of the present invention.

I claim as my invention:

1. In control apparatus operative with an input set point signal and having a plurality of control modes for controlling the operation of a control device, the combination of signal means operative with said control device for providing an actual operation feedback signal, first signal control means responsive to the difference between said input set point signal and said feedback signal for providing an operation change signal, signal converter means responsive to said operation change signal and connected to said control device to provide an output force signal in accordance with a predetermined balance between said change signal and a reference control signal, control means operative with said signal converter means and responsive during a first mode of operation to a predetermined value of said output force signal to provide said reference control signal to said signal converter means, mode selection means connected between said first signal control means and said signal converter means to permit the transmission of said change signal to said signal converter means for a second mode of operation and to block the transmission of said change signal to said signal converter means for said first mode of operation, and second signal control means operative through said mode selection means with said first signal control means during said first mode of operation for reducing substantially to zero said change signal by supplying an additional signal equal in magnitude to the difference between said input set point signal and said feedback signal during said first mode of operation of said control device.

2. In control apparatus operative in at least a manual change mode and an automatic mode and being responsive to an input reference signal for positioning a control device, the combination of transducer means connected to said control device for providing a feedback signal in accordance with the actual position of said control device, signal controller means responsive to each of said reference signal and said feedback signal to provide a position change signal, signal converter means including a signal balance member and operative to provide a first force signal to said balance member in accordance with an output fluid signal supplied to position said control device, first control means responsive to said position change signal for providing a second force signal to said balance member for controlling said output fluid signal, second control means responsive to the value of said output fluid signal during said manual change mode and to a predetermined prior value of said output fluid signal during said automatic mode for providing a third force signal to said balance member for controlling said output fluid signal, signal means operative as a signal time integral device, and mode selection means operative with said first control means to disconnect said position change signal therefrom during said manual change mode and operative with said signal controller means to connect said signal integrator means thereto during said manual change mode to compensate for any difference between said reference signal and said feedback signal resulting from manual change in the position of the control device.

3. In control apparatus for a movable control device and responsive to a desired operation signal, the combination of transducer means connected to said control device to provide an actual operation feedback signal, signal generator means responsive to said desired operation signal and to said feedback signal for providing an operation control signal, signal converter means operative to provide an output force signal to move said control device, signal memory means operative with said signal converter means to retain a prior force signal for controlling the operation of said signal converter means, and mode selection means operable during a first mode of operation to connect the operation control signal to said signal converter means to determine the output force signal in accordance with said operation control signal and operable during a second mode of operation to disconnect said operation control signal from said signal converter means and to cause the signal memory means to provide said prior force signal to said converter means during the second mode of operation.

4. In control apparatus operative in different modes and responsive during one of said modes to an input set point signal and during another of said modes to a manual change signal for controlling the operation of a process, the combination of signal converter means connected to said process to provide an output signal to vary the operation of said process, control means operative with said signal converter means and responsive in said one mode of operation to a previous reference value of said output signal to control the present value of the output signal provided by said signal converter means, feedback signal providing means operative with said process for providing an operation feedback signal, signal controller means responsive to the difference between said input set point signal and said operation feedback signal for providing a process operation control signal, signal determining means operative with said signal converter means and responsive during said one mode of operation to said operation control signal and during said another mode of operation to said manual change signal to determine the value of said output signal, mode switching means connected with said signal converter means to select the one of said operation control signal and said manual change signal that is operative with the signal converter means, and a signal integration device operative with said signal controller means during said another mode of operation for reducing to zero said operation control signal.

References Cited
UNITED STATES PATENTS

| | | | |
|---|---|---|---|
| 2,980,835 | 4/1961 | Williams | 318—22 |
| 3,068,387 | 12/1962 | Koppel | 318—28 |
| 3,077,552 | 2/1963 | Koppel | 318—28 |

BENJAMIN DOBECK, *Primary Examiner.*